US012725042B2

(12) United States Patent
Podrazka et al.

(10) Patent No.: US 12,725,042 B2
(45) **Date of Patent: *Sep. 1, 2026**

(54) AI-BASED PATTERN IDENTIFICATION TRANSFORMER

(71) Applicant: Bank of America Corporation, Charlotte, NC (US)

(72) Inventors: Melissa Podrazka, Chicago, IL (US); Justin Horowitz, Fort Mill, SC (US)

(73) Assignee: Bank of America Corporation, Charlotte, NC (US)

( * ) Notice: Subject to any disclaimer, the term of this patent is extended or adjusted under 35 U.S.C. 154(b) by 170 days.

This patent is subject to a terminal disclaimer.

(21) Appl. No.: 18/911,486

(22) Filed: Oct. 10, 2024

(65) Prior Publication Data

US 2025/0036949 A1 Jan. 30, 2025

Related U.S. Application Data

(63) Continuation of application No. 17/887,641, filed on Aug. 15, 2022, now Pat. No. 12,141,695.

(51) Int. Cl.
*G06N 3/08* (2023.01)
*G06F 40/47* (2020.01)

(52) U.S. Cl.
CPC ............... *G06N 3/08* (2013.01); *G06F 40/47* (2020.01)

(58) Field of Classification Search
CPC .................................. G06N 3/08; G06F 40/47
See application file for complete search history.

(56) References Cited

U.S. PATENT DOCUMENTS 11,386,144 B2 * 7/2022 Chopra ................ G06V 10/764
11,928,209 B2 3/2024 Horowitz et al.

(Continued)

FOREIGN PATENT DOCUMENTS

WO WO2023/014298 2/2023
WO WO-2023014298 A2 * 2/2023 ............... G06N 3/08

OTHER PUBLICATIONS

Horowitz et al., "A Fresh Perspective on Dissecting Action into Discrete Submotions," https://www.ncbi.nlm.nih.gov/pmc/articles/PMC8734945/, Aug. 2016.

(Continued)

*Primary Examiner* — Mohammad K Islam
(74) *Attorney, Agent, or Firm* — Weiss & Arons LLP

(57) ABSTRACT

Apparatus and methods for a pattern identification transformer neural network is provided. The pattern identification transformer neural network may be able to learn from relatively small numbers of data elements. The pattern identification transformer neural network may function in similar method to the way humans transform data points. As such, the pattern identification transformer neural network may be able to learn patterns from a small number of examples and determine what attributes are helpful from a single experience. The pattern identification transformer neural networks may include a multi-head attention module, a normalize module and a feed forward neural network. The multi-head attention module may receive vectors that correspond to experiences. The normalize module may normalize the received vectors. The feed forward neural network may incorporate the received vectors into the neural network.

16 Claims, 8 Drawing Sheets

(56) References Cited

U.S. PATENT DOCUMENTS

| | | | | |
|---|---|---|---|---|
| 2021/0295338 | A1 | 9/2021 | Kreth et al. | |
| 2021/0374525 | A1* | 12/2021 | Bremer | G06F 18/214 |
| 2022/0283922 | A1* | 9/2022 | Shachaf | G06F 11/3452 |
| 2023/0306268 | A1* | 9/2023 | Stepanova | G06F 18/2415 |
| 2024/0054369 | A1 | 2/2024 | Podrazka et al. | |
| 2024/0078586 | A1* | 3/2024 | Wilson | G06Q 30/0282 |
| 2024/0211312 | A1* | 6/2024 | Zeng | G06F 8/452 |
| 2024/0220767 | A1 | 7/2024 | Podrazka et al. | |

OTHER PUBLICATIONS

Lemay et al., "Modulation and Vectorial Summation of the Spinalized Frog's Hindlimb End-Point Force Produced by Intraspinal Electrical Stimulation of the Cord," https://pubmed.ncbi.nlm.nih.gov/11482358/ IEEE Transactions on Neural Systems and Rehabilitation Engineering, vol. 9, No. 1, Mar. 2001.

Prof. Michael Robinson, "Conglomeration of Heterogeneous Content Using Local Topography (CHCLT)," https://www.drmichaelrobinson.net/simplex_techrep.pdf, Mar. 11, 2015.

"Transformer Neural Network Architecture," https://devopedia.org/transformer-neural-network-architecture, Devopedia, Jun. 15, 2022.

Lundberg et al., "A Unified Approach to Interpreting Model Predictions," https://arxiv.org/abs/1705.07874, University of Washington, May 22, 2017.

Hubel et al., "Receptive Fields of Single Neurons in the Cat's Striate Cortex," https://physoc.onlinelibrary.wiley.com/doi/epdf/10.1113/jphysiol.1959.sp006308, Apr. 22, 1959.

Lundberg et al., "A Unified Approach to Interpreting Model Predictions," NIPS, 2017.

Sundararajan et al., "Axiomatic Attribution for Deep Networks," International Conference on Machine Learning, Jun. 13, 2017.

"Integrated Gradients," https://www.tensorflow.org/tutorials/interpretability/integrated_gradients, Mar. 19, 2021.

Kumar et al., "Problems with Shapley-Value-Based Explanations as Feature Importance Measures," International Conference on Machine Learning, Jun. 30, 2020.

Renu Khandelwal, "Understanding Deep Learning Models with Integrated Gradients," https://towardsdatascience.com/understanding-deep-learning-models-with-integrated-gradients-24ddce643dbf, Nov. 4, 2020.

* cited by examiner

- Summation and argmax fail
- Simplexes capture color

AI-BASED PATTERN IDENTIFICATION TRANSFORMER

CROSS REFERENCE TO RELATED APPLICATION

This application is a continuation of U.S. patent application Ser. No. 17/887,641 filed on Aug. 15, 2022 and entitled "AI-BASED PATTERN IDENTIFICATION TRANSFORMER" which is hereby incorporated by reference herein in its entirety.

FIELD OF TECHNOLOGY

Aspects of the disclosure relate to artificial intelligence.

BACKGROUND OF THE DISCLOSURE

Artificial intelligence (AI) may be defined as the capability of a computer to simulate tasks typically performed by human beings. Various applications of artificial intelligence may include natural language processing, speech and handwriting recognition and machine vision.

Some of the capabilities associated with artificially intelligent computers may include the capability to reason, the capability to discover meaning and the capability to generalize. For the purposes of this application, the capability to reason may be understood to mean the ability to comprehend an objective, if any, attributable to a set of circumstances. For the purposes of this application, the capability to discover meaning may be understood to mean the ability to understand the cause and significance of a set of circumstances. For the purposes of this application, the capability to generalize may be understood to mean the ability to apply past experience to analogous new experiences.

In order to simulate human intelligent in a computer, an initial step may include identification and understanding of various aspects of human intelligence. Such aspects may include learning, reasoning, problem solving, perception, use of language and self-correction.

Upon identification and understanding of human intelligence, a second step may involve building an artificial intelligence model. An artificial intelligence model may be a tool or algorithm which is based on a certain data set through which the model can determine a prediction. Artificial intelligence models may include deep neural networks.

A deep neural network may be a model that includes multiple hidden layers between the input and the output. Each of the hidden layers may include artificial neurons that are interconnected. Deep neural networks typically learn from labeled training data in order to predict an output based on inputs in a production environment.

Many times, a developer creates a deep neural network. The deep neural network typically includes an input layer, an output layer and a plurality of hidden layers. Each of the layers includes a plurality of neurons.

Once deep neural network is created, the developer may tune the network. Tuning the network may include adding or subtracting layers of neurons and/or adding or subtracting the number of neurons within a layer. Once the network is tuned, the developer may use the model to predict outcomes.

However, the developer is rarely able to explain the process used by the deep neural network to determine the outcome. In other words, it is difficult to explain the inner workings of a neural network with respect to the underlying cause that a specific set of inputs produced a particular outcome.

Many times, the inability to explain what caused the inputs to generate, or otherwise obtain, a specific outcome, creates a large amount of resource consumption in the re-creation of the process between the inputs and the outcome. For example, if a model outputs B for inputs X, Y and Z, human intervention may be required to recreate the entire input process between X, Y and Z to understand how it produces B.

In order to minimize the relatively large resource consumption required to recreate such a process, there has been a trend in the field of artificial intelligence called explainable artificial intelligence. Explainable artificial intelligence may use machine processes in order to attribute the outcome of a process to the important inputs. Various mathematical equations have been written and deployed to identify a solution that attributes the outcome of a process to the important inputs.

These solutions include SHAP (Shapley additive explanations) by Lundberg and Lee. SHAP is based on the Shapley Values optimization, which utilizes a collaborative contest where players are associated with the outcome of the contest. When using SHAP in AI, the outcome of the contest is the prediction, and the players are the various features inputted to determine the prediction. The result of SHAP is similar to feature importance. SHAP can be explained as optimized aggregations of Shapley values. As such, SHAP provides a solution for identification of a single most important input.

Another solution used in explainable AI is integrated gradients by Sundararajan, Tal and Yan. Integrated gradients is a system that identifies the most important inputs by integrating each input with respect to a baseline.

Each of these solutions enables identification of important inputs into a model. However, none of the available solutions include creating an explainable deep neural network. It would be desirable to create a neural network that is self-explanatory.

SUMMARY OF THE DISCLOSURE

A method for creating an AI-based pattern identification transformation neural network directly from a set of training data is provided. It should be noted that the neural network may be created by defining each neuron to correspond to a historic training data set as opposed to letting the network create the neurons based on labeled training sets.

The method may include receiving a plurality of data sets. Each data set may include a plurality of data elements. Each data element, included in each data set, may identify one of more attributes of the data set.

The method may include converting each data element within the data set into a data point. The method may include creating a simplex for each data set. The simplex may include one or more lines. Each line within the simplex may correspond to a data element included in the data set. A space of the simplex may be a Reproducing Kernel Hilbert Space.

The method may include converting each simplex into a neuron. The neuron may be used by a neural network. The neural network may include a plurality of neurons. The method may include creating a neural network using the plurality of neurons.

Each simplex created for each data set may include a weight for line within the simplex. The weight may be defined by a significance of the data element. As such, each simplex may include a weighted average of the included data elements.

The method may also include receiving an unlabeled data set. The method may include associating the unlabeled data set with one of the plurality of neurons. The method may include labeling the unlabeled data set by the neural network.

The method may include receiving a first data set. The method may include transforming the first data set from a first language to a second language. The first language and the second language may be human-spoken languages, computer languages or any other suitable languages.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
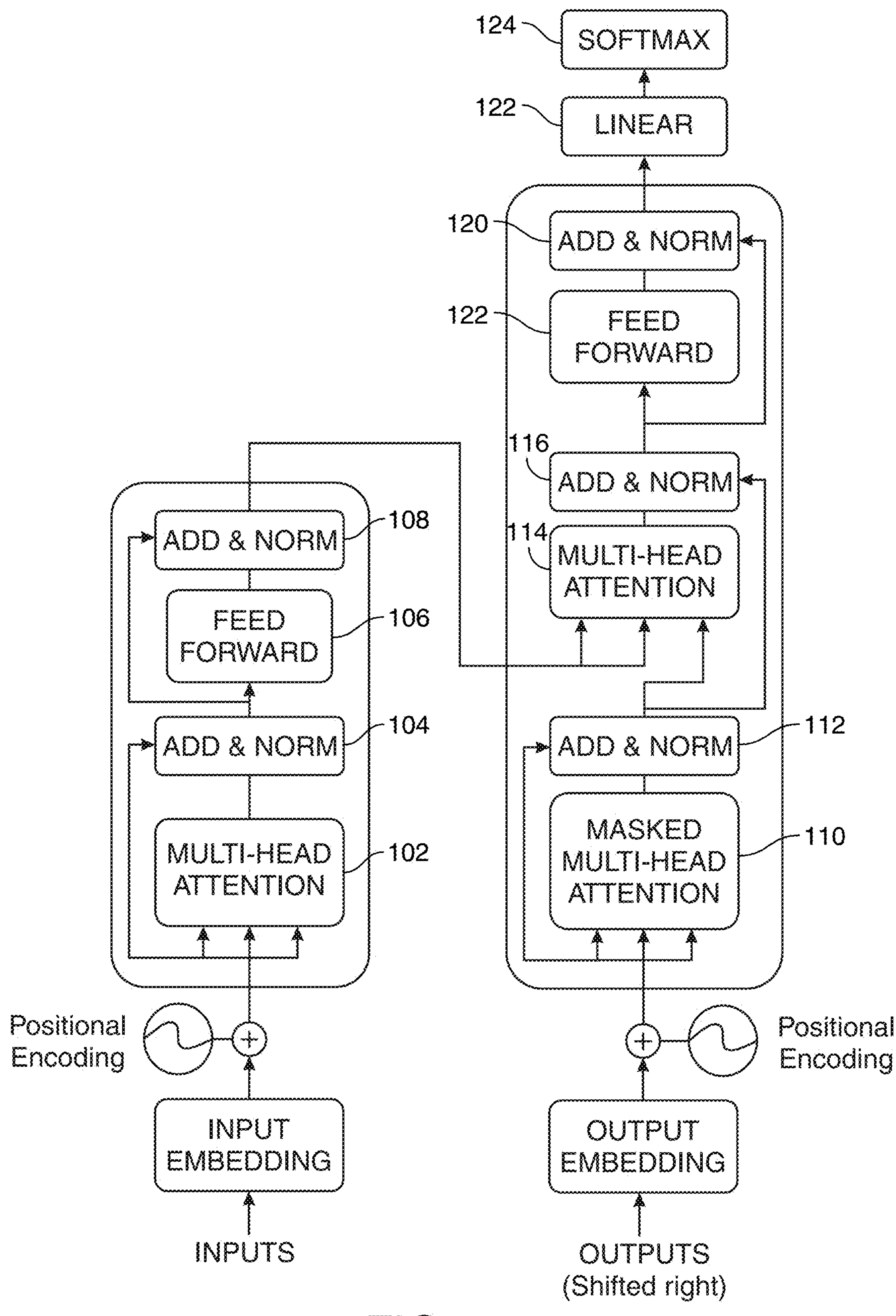
FIG. 1 shows an illustrative diagram in accordance with principles of the disclosure.

Apparatus and methods for AI-based pattern identification transformer neural network is provided. The network may include a multi-head attention module, a normalization module and a feed forward neural network. The multi-head attention module, the normalization module and the feed forward neural network may operate on one or more hardware processors and one or more hardware memory drives.

The multi-head attention module may receive a first data element. The first data element may include a first set of attributes. The multi-head attention module may also convert the first data element and the first set of attributes into a first vector.

The normalization module may normalize the first vector. The feed forward neural network may add the first vector to the feed forward neural network.

The multi-head attention module may receive a second data element comprising a second set of attributes. The multi-head attention module may convert the second data element comprising the second set of attributes into a second vector. The multi-head attention module may examine the feed forward neural network for a corresponding vector included in the feed forward neural network. The corresponding vector may correspond to the second vector. The corresponding vector may enable the feed forward neural network to appropriately classify the second vector.

The normalization module may examine the feed forward neural network for a plurality of vectors included in the feed forward neural network. The normalization module may add the plurality of vectors to create a sum. The normalization module may divide the plurality of vectors by its sum to ensure that the plurality of vectors is a simplex. The components of the simplex may add up to 1. The normalization module may divide the plurality of vectors by its sum to generate an answer. The feed forward neural network may use the answer to enable a mapping between the second vector and a third vector.

A map between a vector x and a vector y may be approximated by $\hat{y}(x)=\Sigma_n y_{c,n} k_n(x, c_n)$, where n is the number of vectors, c is a previously stored vector and k is the plurality of vectors.

The plurality of vectors may be used for a reconstruction.

The feed forward network may tune the plurality of vectors upon receiving a new vector. As such, the feed forward network may add the new vector to the plurality of vectors. Once the new vector is added to the plurality of vectors, the normalization module may add the plurality of vectors to re-create the sum. The normalization module may re-divide the plurality of vectors by its sum to ensure that the plurality of vectors is a simplex and to generate an answer.

The following set of equations may be used to identify a triangle centered on a preferred stimulus.

$$a(x) = 1 - |\omega \cdot x - \tau| \qquad \text{Equation set A}$$

$$\kappa(x) = \begin{cases} a, & \text{if } a > 0 \\ 0 & \text{otherwise} \end{cases}$$

The following set of equations may be used to identify a one-dimensional simplex on a closed interval.

$$a(x) = 1 - |\omega_a \cdot x - \tau_a|;\ b(x) = 1 - |\omega_b \cdot x - \tau_b| \qquad \text{Equation set B}$$

$$\forall\ x \text{ s.t. } c_a < x < c_b : a(x) + b(x) = 1$$

$$f(x) = F_a a(x) + F_b b(x)$$

$$f(c_a) = F_a \rightarrow a(c_a) = 1;\ b(c_a) = 0$$

$$a(x|c_a \le x \le c_b) = 1 - \frac{x - c_a}{c_b - c_a}$$

$$b(x|c_a \le x \le c_b) = 1 - \frac{c_b - x}{c_b - c_a}$$

The following equation may be used to identify a one-dimensional representation.

$$a(x) = 1 - \left|\frac{x - c_a}{c_b - c_a}\right| \qquad \text{Equation set C}$$

The following equation may be used to identify a submotion vector that evolves in time. It should be noted that a start point may be t=−s and a peak point may be t=0.

$$\vec{x}(t = 0) = \vec{c} \qquad \text{Equation set D}$$

$$\vec{x}(t) = (\vec{c} - \vec{x}_{-1})t + \vec{c}$$

$$\vec{x} - \vec{c} = (\vec{c} - \vec{x}_{-1})t$$

Because it may be difficult to divide by a vector, as included in equation set D, the following equation set may include dotting both sides with the right-side vector to get a scalar.

$$(\vec{x}-\vec{c})\cdot(\vec{c}-\vec{x}_{-1}) = (\vec{c}-\vec{x}_{-1})^2 t$$

$$t = \frac{(\vec{x}-\vec{c})\cdot(\vec{c}-\vec{x}_{-1})}{(\vec{c}-\vec{x}_{-1})^2}$$

$$\kappa(x) = \begin{cases} 1-|t|, & \text{if } -1 \le t \le 1 \\ 0 & \text{otherwise} \end{cases}$$

Equation set E

The above equation simplified may be written as follows:

$$t = \frac{(\vec{x}-\vec{c})\cdot(\vec{c}-\vec{x}_{-1})}{(\vec{c}-\vec{x}_{-1})^2}$$

$$\kappa(x) = \begin{cases} 1-|t|, & \text{if } -1 \le t \le 1 \\ 0 & \text{otherwise} \end{cases}$$

Equation set F

The following equation solves for $\vec{x}_{-1}$.

$$t = \frac{(\vec{x}-\vec{c})\cdot(\vec{c}-\overline{x})}{(\vec{c}-\overline{x})^2}$$

$$\omega = \frac{(\vec{c}-\overline{x})}{(\vec{c}-\overline{x})^2};\ \tau = \overline{x}\cdot\omega$$

Equation set G

With a frozen ω, κ(x, c)=κ(c, x), 0≤κ≤1, κ may be symmetric and positive definite. This may imply a Reproducing Kernel Hilbert Space (RKHS). Through Representer Theorems, a linear combination of these k may be useful.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative diagram. The illustrative diagram shows receiving inputs at multi-head attention sensors, shown at 102. The multi-head attention sensors may receive information relating to experiences. The information relating to an experience may also be defined as a data object. The data object may have different attributes. The data object, or experience, may be identified as $\vec{x}$ or $\vec{x}(t)$.

The multi-head attention sensors may pass the data object, also identified as $\vec{x}$ or $\vec{x}(t)$ to add and norm module, shown at 104. In order to classify the $\vec{x}$ data object, the add and norm module may attempt to find similar attributes between the $\vec{x}$ data object and previous experiences $\vec{c}$.

Add and norm module, shown at 104, may normalize each received experience into a data object and add the data object or experience to a list of data objects or experiences. The list of data objects or experiences may be referred to a k(x). The list of data objects or experiences may be divided by its sum in order to ensure that it is a simplex.

A simplex may be the simplest possible geometric object. A simplex may be characterized by its flat sides. A simplex may be used to classify any given space. It should be noted that an n-simplex may be a polygon that requires n dimensions. For example, a 0-simplex may be a point, a 1-simplex may be a line segment, a 2-simplex may be a triangle and a 3-simplex may be a tetrahedron. It should be noted that a simplex may occupy and/or represent any given space. Furthermore, in topology, multiple simplices may be connected to form a simplicial complex. Simplices may capture relationships among dimensions without predefining the relationships. As such, without simplices, relationships among different dimensions may be predefined, while relationships among dimensions that utilize simplices may automatically adjust to the changes within the relationships and/or the dimensions.

Using the representer theorem, the simplexed k(x) may be useful for a reconstructing a previous experience, or data object. The representer theorem may be used in a statistical learning theory of computer science. The representer theorem may be identified as any of several relating results stating that a minimizer f* of a regularized empirical risk functional defined over a reproducing kernel Hilbert space (RKHB) can be represented as a finite linear combination of kernel products evaluated on the input points in a training data set.

Therefore, for any map f: x→y, a useful approximation of the map may be $\hat{y}(x)=\Sigma_n y_{c,n} k_n(x, c_n)$. This may be true for a given x, a given y and a given k. It should be noted that x may be transformed into y. Additionally, k may be the list of data objects or experiences. Furthermore, x may be unclassified data object, and y may represent a classified data object. Therefore, the above equation of $\hat{y}(x)=\Sigma_n y_{c,n} k_n(x, c_n)$ may be understood to mean the transformation of x→y may be equivalent to the summation of the above-mentioned parameters.

It should be noted that add and norm module 104 may create neurons directly from the experiences received at the multi-headed attention 102. Furthermore, add and norm module 104 may also at times uses gradient descent to create the neurons from the experiences. As such, add and norm module 104 may also be referred to as subtract and norm module 104.

Feed forward module 106 may include creating and/or utilizing an activation space for the neurons. In order to minimize the number of neurons created within a neural network, an x-sparsification method, such as one described in co-pending, commonly-owned patent application Ser. No. 17/883,784 filed on Aug. 9, 2022, entitled "AI-BASED SELECTION USING CASCADED MODEL EXPLANATIONS", which is hereby incorporated by reference herein in its entirety.

It should be noted that multiple add and norm modules, such as add and norm module 108 may be used throughout the process. Furthermore, outputs may also be processed as shown at modules 110, 112, 114, 116, 118 and 120. At multi-head attention model 114, the inputs and the outputs may be combined.

In order to enable the reconstruction of g: $x \rightarrow \hat{x}$ using the equation $x'=[x-\hat{x}\|k]$ where $\|$ means concatenation. This is particularly useful when the objective of the function is input attribution.

Linear module 122 and softmax module 124 may be used to complete the creation of the neural network.

Figure 2:
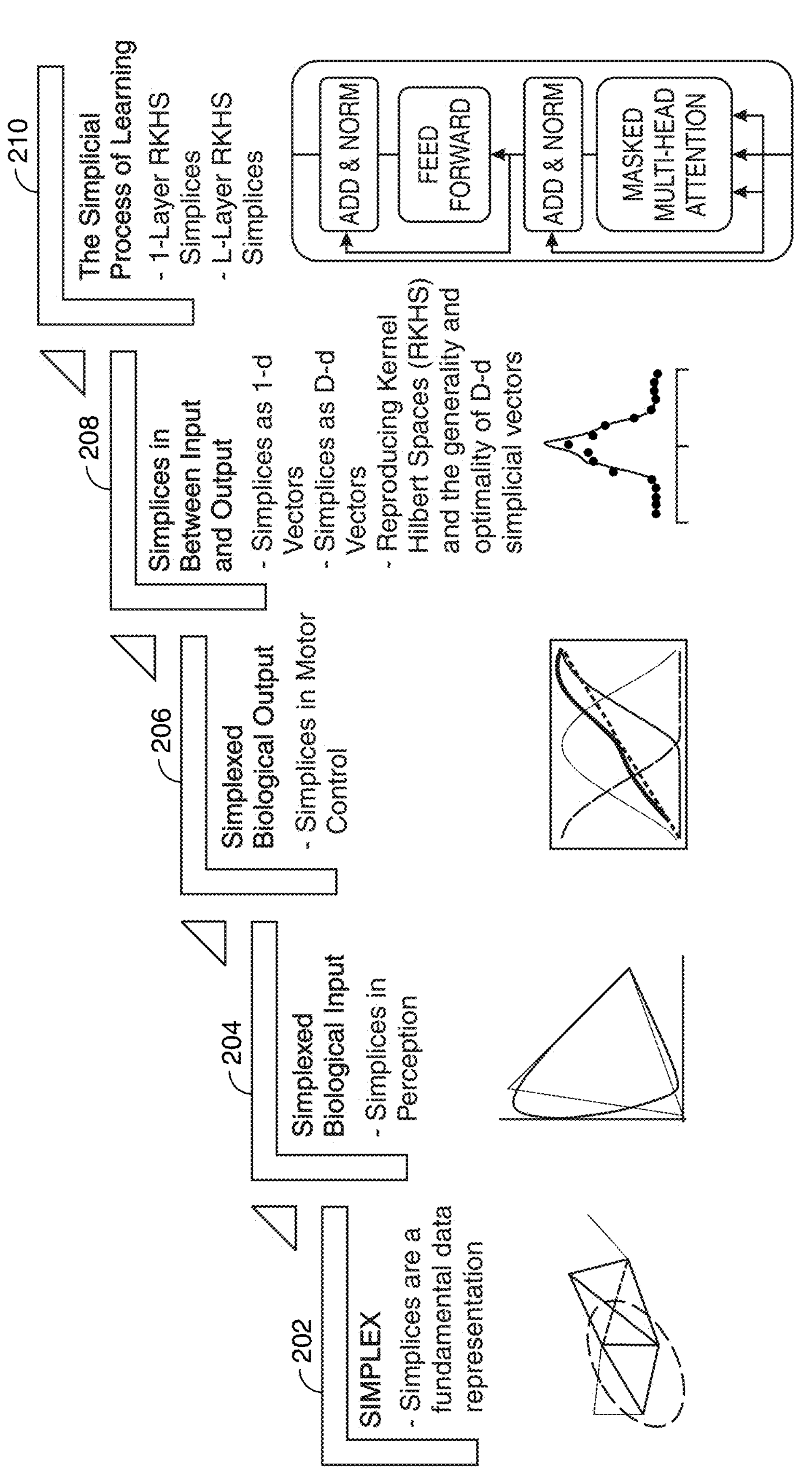
FIG. 2 shows another illustrative diagram in accordance with principles of the disclosure.

FIG. 2 shows another illustrative diagram. The illustrative diagram shows multiple simplexes and various occurrences for the use of simplexes.

Step 202 shows a simplex. Simplices may be a fundamental data representation. A simplex may be defined, as described earlier, as the simplest possible geometric object. A simplex may be characterized by its flat sides. A simplex may be used to classify any given space. It should be noted that an n-simplex may be a polygon that requires n dimensions. For example, a 0-simplex may be a point, a 1-simplex may be a line segment, a 2-simplex may be a triangle and a 3-simplex may be a tetrahedron. It should be noted that a simplex may occupy and/or represent any given space.

Step 204 shows a simplex used in biological input. Specifically, the simplex may identify simplices in perception. For example, human eyes use three types of cone cells and opsins to identify colors. As such, the combination of the viewing of each of the cone cells and opsins identify the color. It should be noted that summation and/or argmax functions fail to identify the distinct 3-way identification. Human senses are programmed to simplex a color input. As such, instead of viewing a specific color as its components of red, green and blue, a human may view the color combination as a simplex combination.

Step 206 shows another simplex used in biological input. Specifically, the simplex may identify simplices in motor control. For example, humans utilize fundamental building blocks to encode movement. Lump primitives may be easily observed in humans. Once the lump primitives were defined within neurotypical adults, robots and new algorithms were generated. Simplexing the vectors assigned to the lump primitives can recover human's smooth blended movements.

Step 208 shows simplices between input and output. Simplices may include 1-dimensional vectors. Simplices may include d-dimensional vectors. Simplices may occupy reproducing kernel Hilbert spaces (RKHS) and the generality and optimally of D-d simplicial vectors.

Step 210 shows using simplices for machine learning. The simplices may occupy 1-layer RKHS spaces. The simplices may occupy 1-layer RKHS spaces. Such simplices may utilize the process shown in FIG. 1.

Figure 3A:
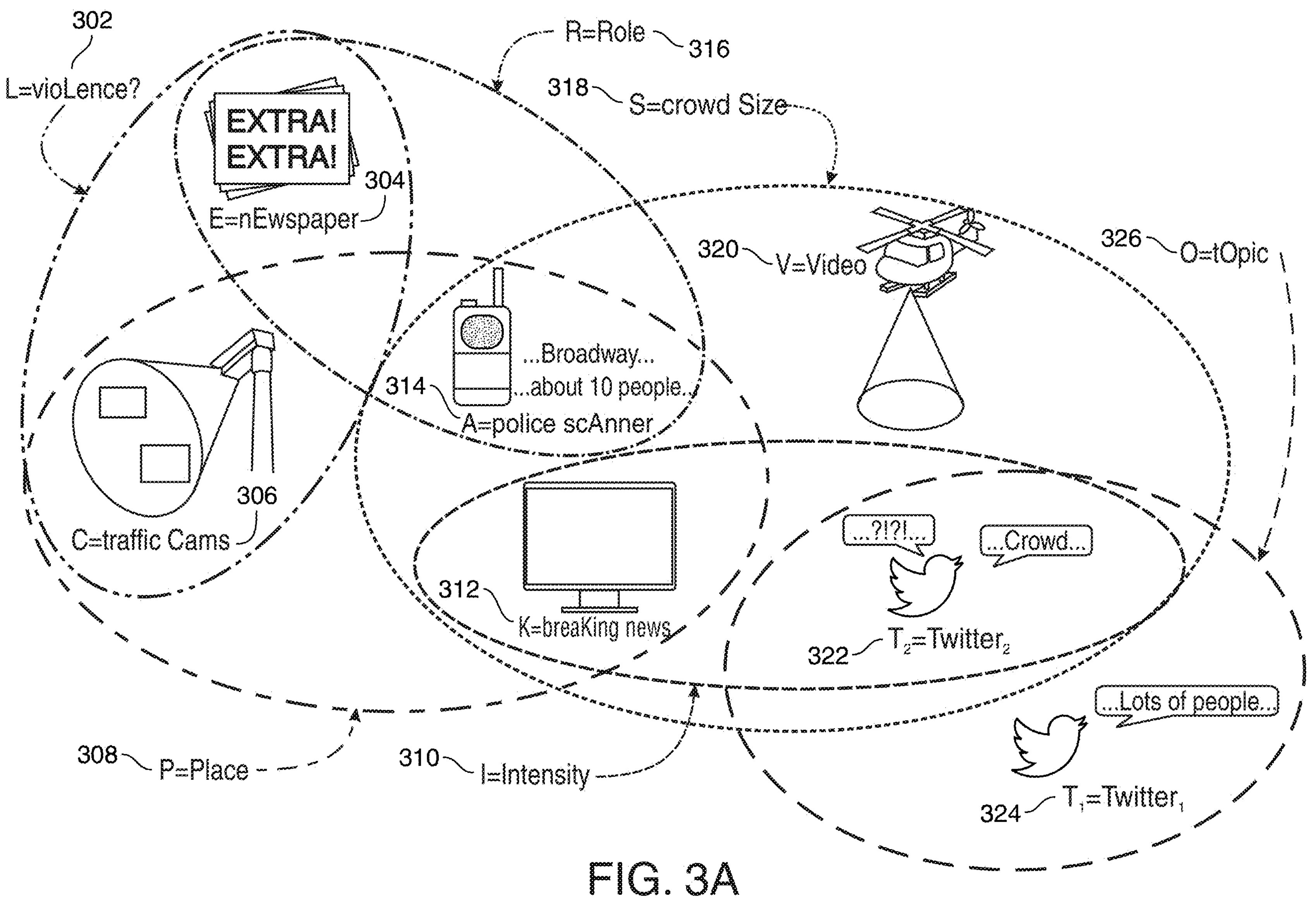
FIG. 3A shows yet another illustrative diagram in accordance with principles of the disclosure.

FIG. 3A shows another illustrative diagram. The illustrative diagram shown in FIG. 3A was taken from "Conglomeration of Heterogenous Content using Local Topology (CHCLT)" by Prof. Michael Robinson. Portable Document Format (PDF) is available at https://www.drmichaelrobinson.net/simple_techrep.pdf.

The illustrative diagram shows data points used to form a simplex. The data points may include various news points. Each of the news points may be a data object. Each of the news points may be retrieved from a public or nonpublic data source. Each of news points may be linked to the other news points to form a simplex.

Data point 302 may correspond to an "L" data point, which may characterize violence data. Data point 304 may correspond to an "E" data point, which may characterize newspaper data. Data point 306 may correspond to a "C" data point, which may characterize traffic camera data. Data point 308 may correspond to a "P" data point, which may characterize a place. Data point 310 may correspond to an "I" data point, which may characterize an intensity metric. Data point 312 may correspond to a "K" data point, which may characterize a breaking news metric. Data point 314 may correspond to an "A" data point, which may characterize a police scanner. Data point 316 may correspond to an "R" data point, which may characterize a role. Data point 318 may correspond to a "S" data point, which may characterize a crowd size. Data point 320 may correspond to a "V" data point, which may characterize a video. Data point 322 may correspond to a "$T_2$" data point, which may characterize a twitter or other social media post. Data point 324 may correspond to a "$T_1$" data point, which may characterize a twitter, or other social media post. Data point 326 may correspond to an "O" data point, which may characterize an optic metric.

Figure 3B:
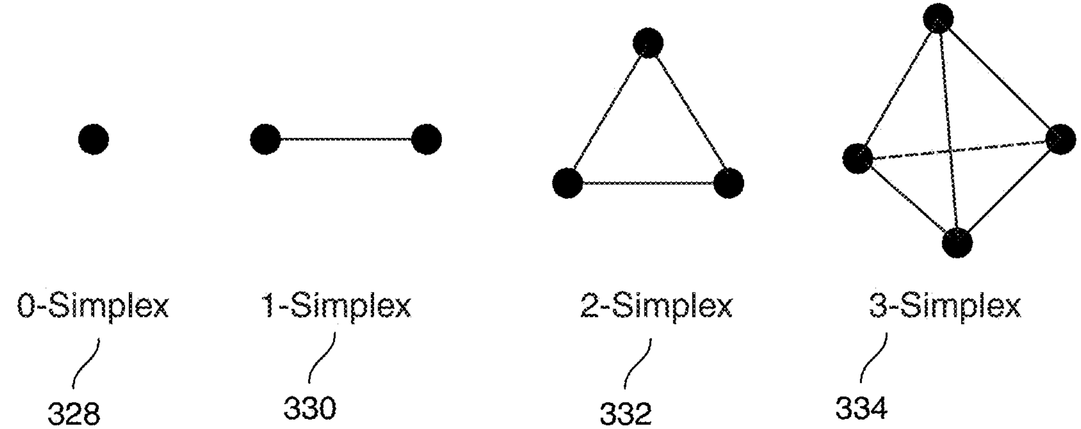
FIG. 3B shows still another illustrative diagram in accordance with principles of the disclosure.

FIG. 3B shows another illustrative diagram. The illustrative diagram shows four simplices. The 0-simplex, shown at 328, may include a single point. The 1-simplex, shown at 330, may include two points connected by a single line. It should be noted that the 1-simplex occupies one dimension. The 2-simplex, shown at 332, may include three points connected by three lines. It should be noted that the 2-simplex may occupy two dimensions. The 3-simplex, shown at 334, may include four points connected by six lines. It should be noted that the 3-simplex occupies three dimensions.

Figure 3C:
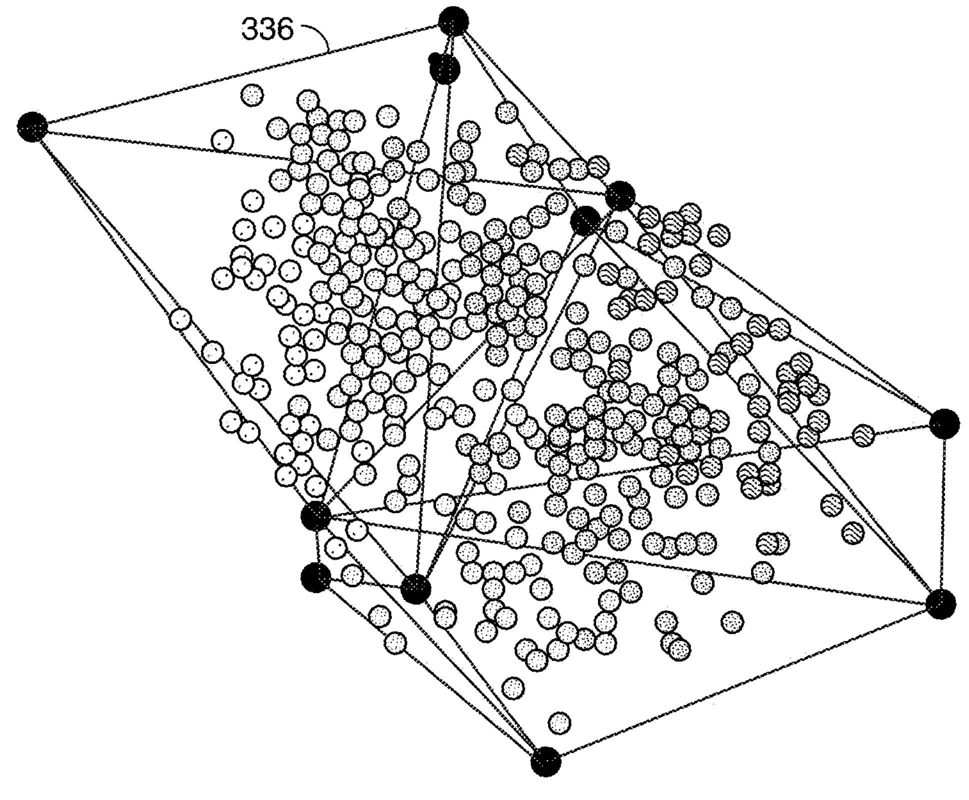
FIG. 3C shows yet another illustrative diagram in accordance with principles of the disclosure.

FIG. 3C shows another illustrative diagram. The illustrative diagram shows simplex 336. Simplex 336 may include multiple points. Each of the points may be connected to other points using lines. The space occupied by the simplex may include additional points. The additional points may create one or more data objects that the simplex is attempting to capture.

Figure 3D:
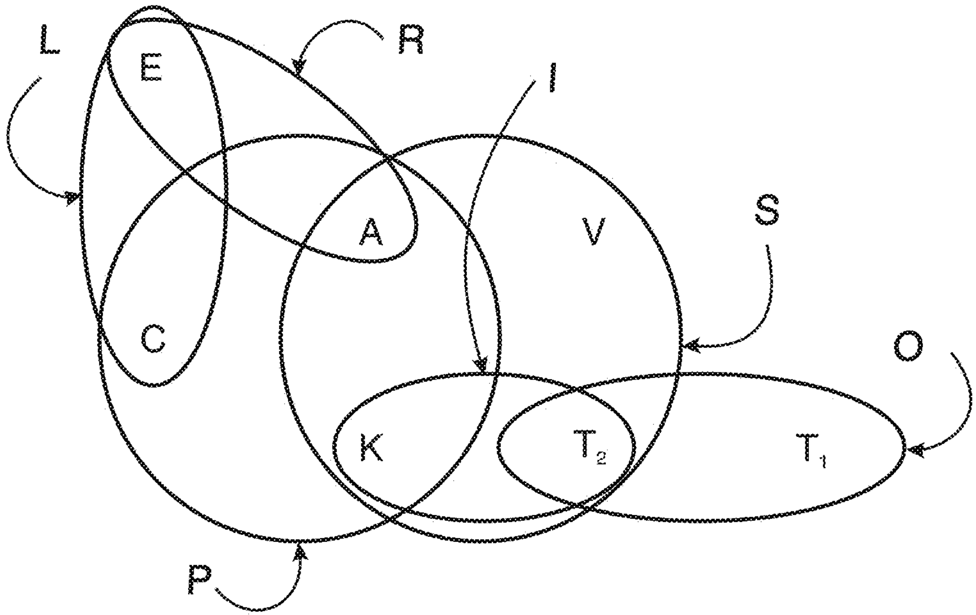
FIG. 3D shows still another illustrative diagram in accordance with principles of the disclosure.

FIG. 3D shows another illustrative diagram. The illustrative diagram shown in FIG. 3D was taken from "Conglomeration of Heterogenous Content using Local Topology (CHCLT)" by Prof. Michael Robinson. Portable Document Format (PDF) is available at https://www.drmichaelrobinson.net/simple_techrep.pdf. The illustrative diagram corresponds to the data points shown in FIG. 3A without any additional information. Each data point is represented by a single letter.

Figure 3E:
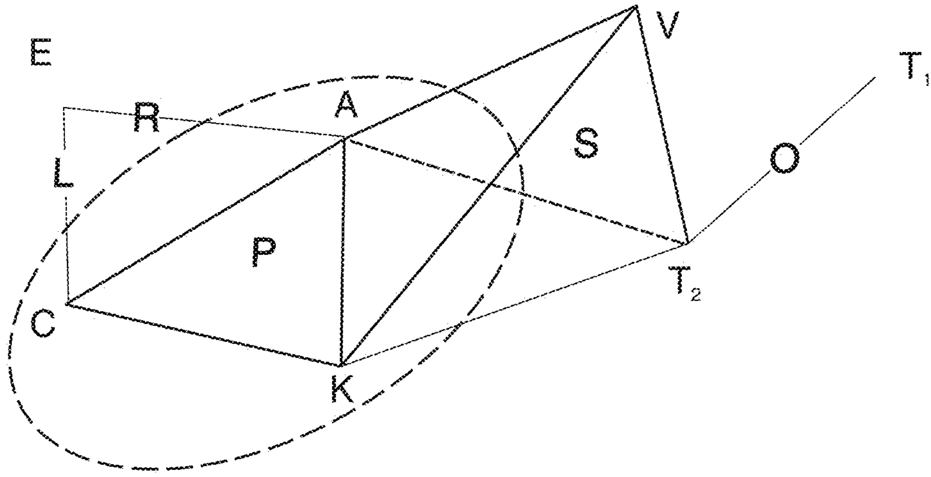
FIG. 3E shows yet another illustrative diagram in accordance with principles of the disclosure.

FIG. 3E shows another illustrative diagram. The illustrative diagram shown in FIG. 3E was taken from "Conglomeration of Heterogenous Content using Local Topology (CHCLT)" by Prof. Michael Robinson. Portable Document Format (PDF) is available at https://www.drmichaelrobinson.net/simple_techrep.pdf. The illustrative diagram shows a simplex that corresponds to the data points shown in FIGS. 3A and 3D.

Figure 4A:
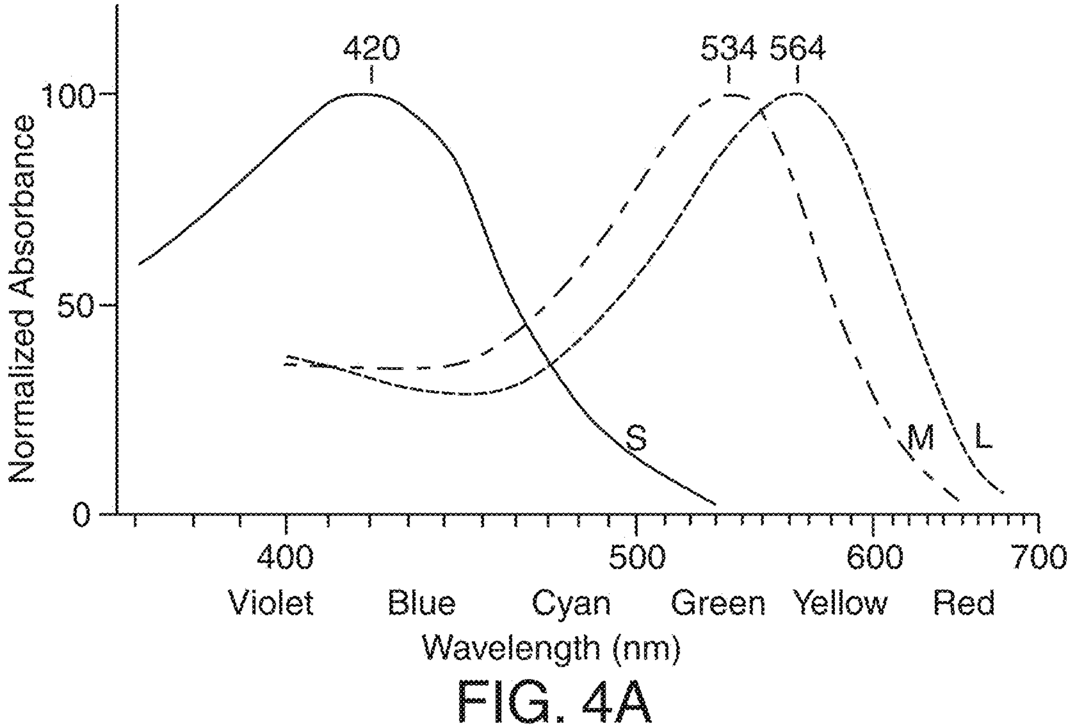
FIG. 4A shows still another illustrative diagram in accordance with principles of the disclosure.

FIG. 4A shows another illustrative diagram. The illustrative diagram shows a graph of biologically simplexed inputs. Specifically, humans use three types of cone cells and opsins. Furthermore, S, M and L cells encode blue, green and red color vision. The human brain combines the inputs into a simplex. As such, the human views the input as a single color instead of its component parts.

Figure 4B:
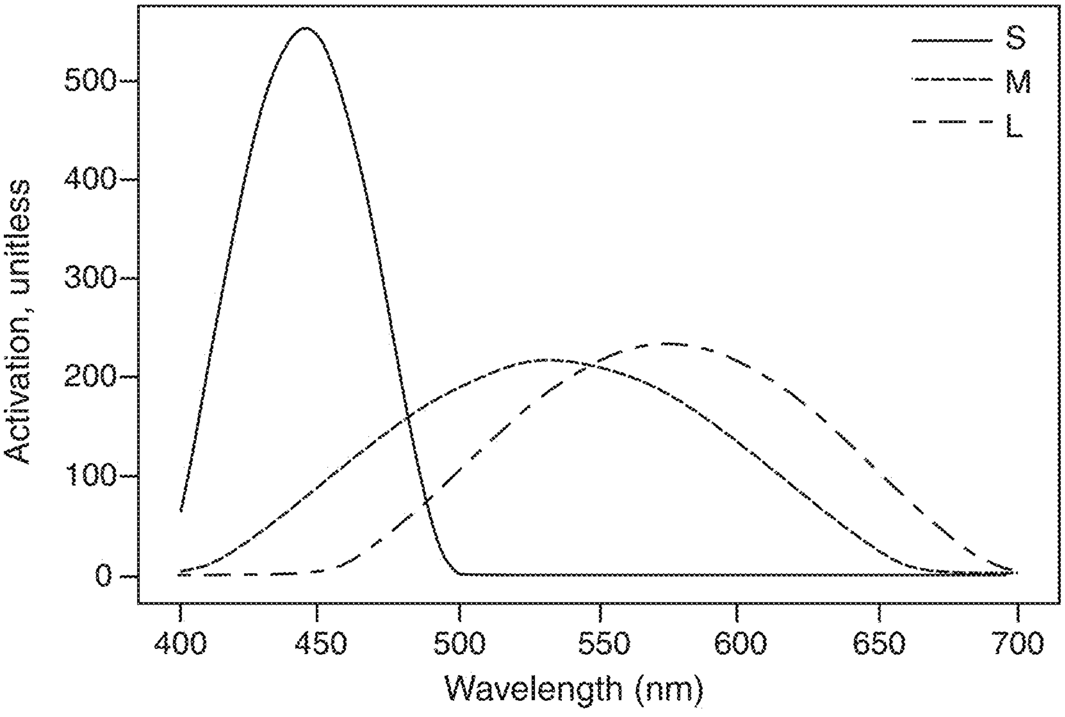
FIG. 4B shows yet another illustrative diagram in accordance with principles of the disclosure.

FIG. 4B shows another illustrative diagram. The illustrative diagram shows another graph of biologically simplexed inputs. Specifically, the combination of the inputs of S, M and L cells may be simplexed as inputs into the human brain.

Figure 4C:
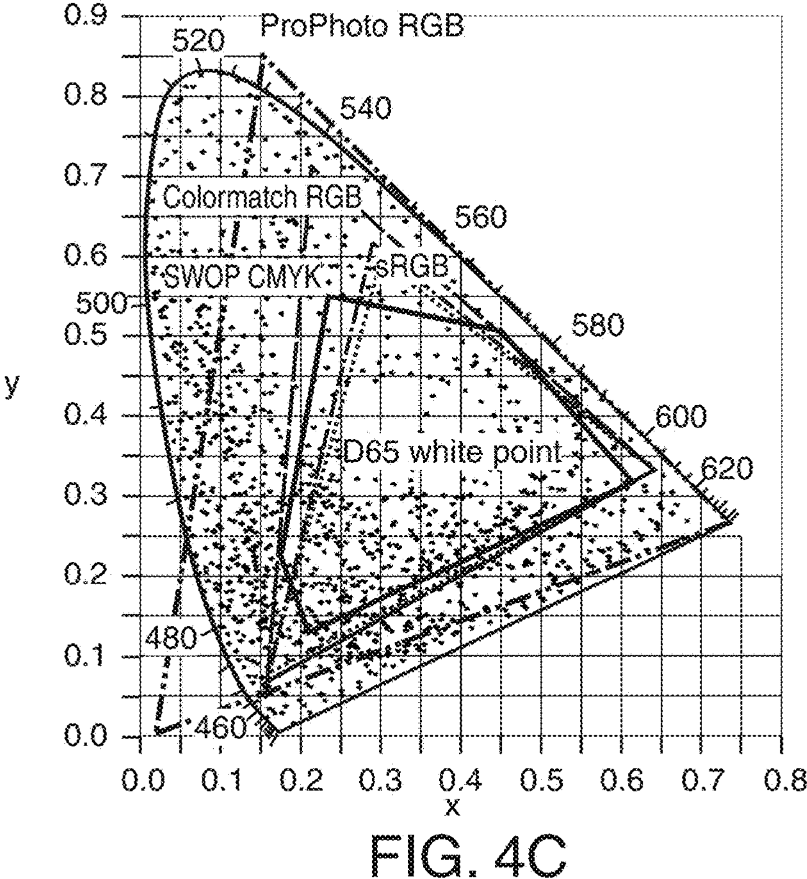
FIG. 4C shows still another illustrative diagram in accordance with principles of the disclosure.

FIG. 4C shows another illustrative diagram. The illustrative diagram shows another graph of biologically simplexed inputs. Specifically, the combination of the inputs of the red, green and blue components of a color may simplexed as input. It should be noted that summation algorithms and argmax algorithms fail to capture color. Furthermore, simplexes accurately capture color.

Figure 4D:
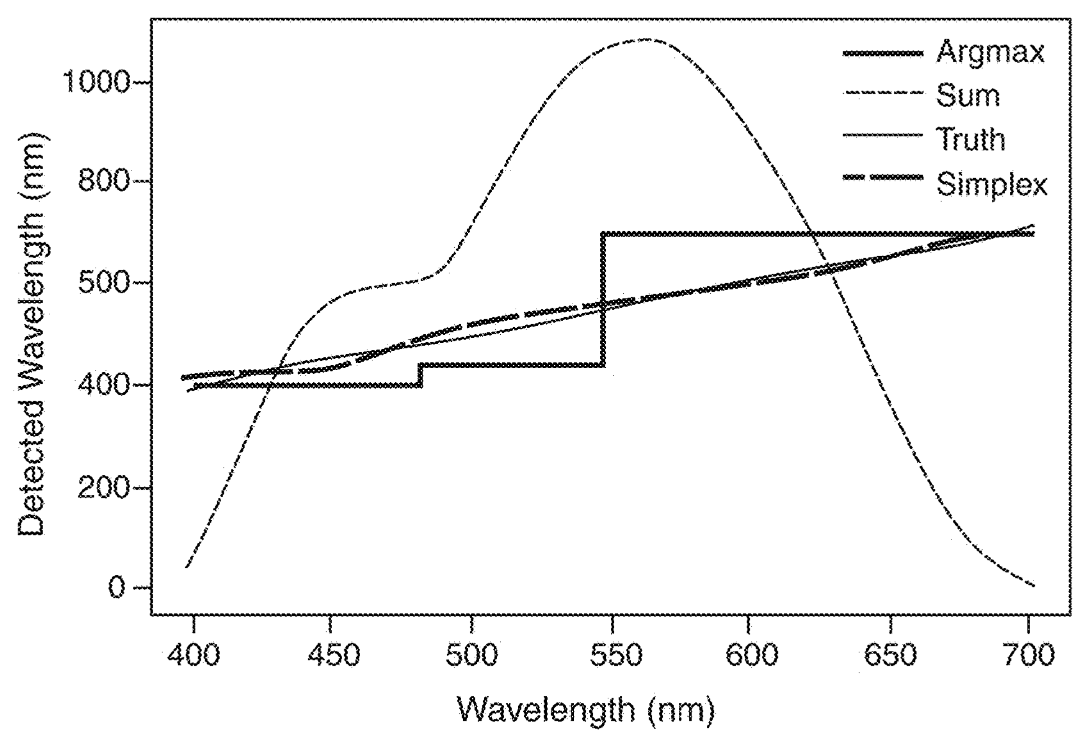
FIG. 4D shows yet another illustrative diagram in accordance with principles of the disclosure.

FIG. 4D shows another illustrative diagram. The illustrative diagram shows another graph of biologically simplexed inputs. Specifically, the graph compares argmax algorithms, sum algorithms and simplex algorithms to the truth of a detected wavelength. It should be noted that the simplex algorithm is considerably closest to the truth of a detected wavelength.

Figure 5:
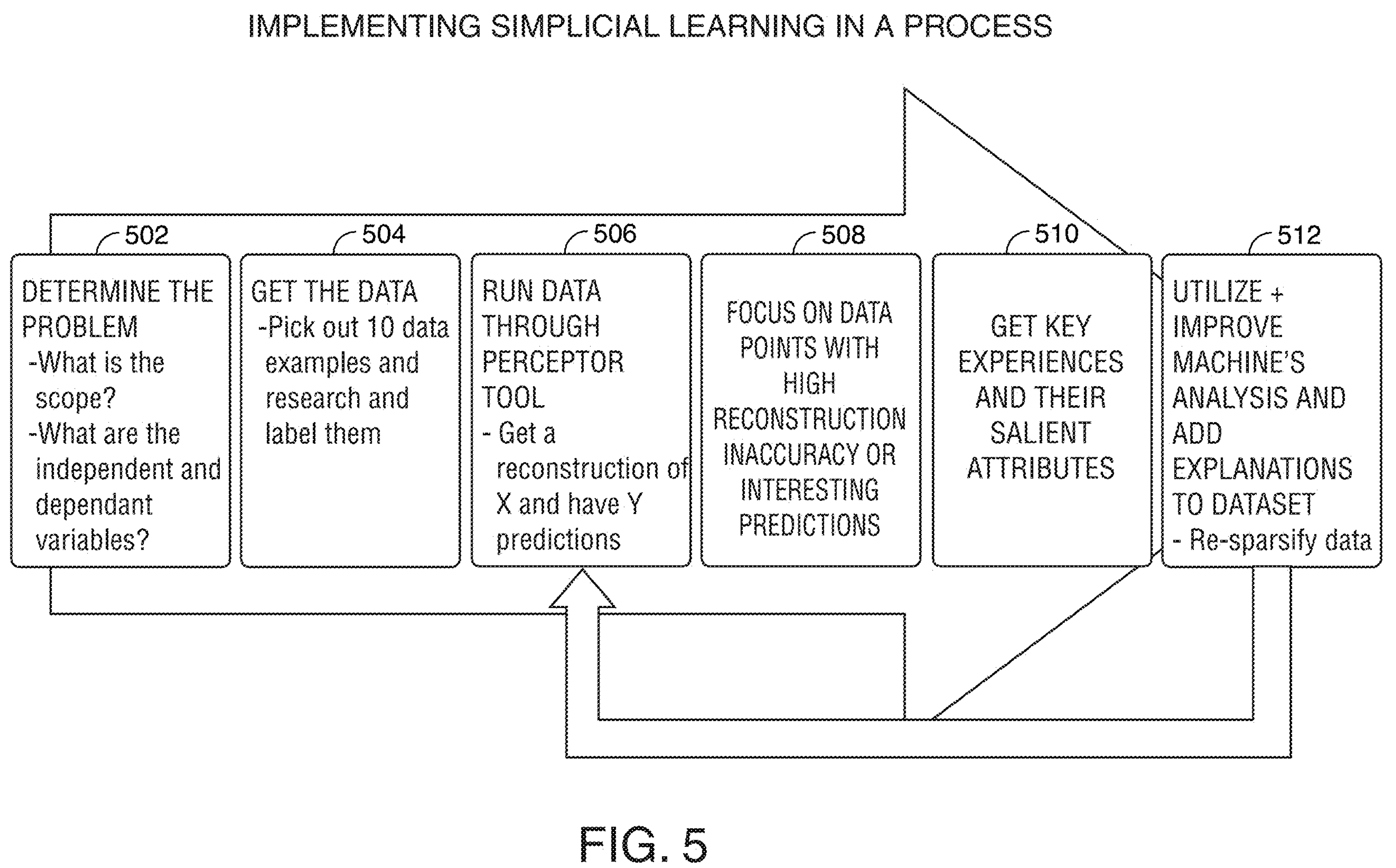
FIG. 5 shows an illustrative flow chart in accordance with principles of the disclosure.

FIG. 5 shows an illustrative flow diagram. The illustrative flow diagram shows implementing simplicial learning in a machine learning process. Step 502 shows determining what is the problem. The determination may include identifying the scope of the problem. The determination may also include identifying what are the independent and dependent variables.

Step 504 shows getting the data. The data may be training data. As such, the system may select data examples, research the data examples and label the data examples. At times, the system may select a predefined number of data examples, such as 10.

Step 506 shows running the data through the preceptor tool. Processing the data using the preceptor tool may produce a reconstruction of X and provide Y predictions.

Step 508 shows focusing on data points with reconstruction inaccuracy or interesting predictions. This step may involve using additional algorithms to identify the cause of the reconstruction inaccuracy or the interesting or anomalous predictions.

Step 510 shows get key experiences and their salient attributes. This step may involve selecting the experiences that most closely define a target experience. The step may also involve selecting salient attributes of the selected experiences.

Step 512 shows utilizing and improving a machine's analysis and adding explanations to the data set. As such, the machine will continuously learn and improve based on information learned within a production environment. The machine will continuously re-sparsify the data in order to remove attributes that negatively impact a prediction.

Thus, systems and methods for AI-based pattern identification transformation neural networks is provided. Persons skilled in the art will appreciate that the present invention can be practiced by other than the described embodiments, which are presented for purposes of illustration rather than of limitation. The present invention is limited only by the claims that follow.

What is claimed is:

1. A system for creating an AI-based pattern identification transformation neural network, the system comprising:
- a hardware processor operating on a hardware memory, the hardware processor operable to:
  - receive a plurality of data sets, each data set included in the plurality of data sets comprising a plurality of data elements, each data element included in each data set identifying an attribute of the data set;
  - convert each data element within the data set into a data point;
  - create a simplex for each data set, said simplex comprising a plurality of lines, where each line within the simplex corresponds to a data element of the data set, where a space of the simplex is a Reproducing Kernel Hilbert Space;
  - convert each simplex into a neuron, said neuron to be used by a neural network, said neural network comprising a plurality of neurons; and
  - create a neural network using the plurality of neurons.

2. The system of claim 1, wherein each simplex created for each data set comprises a weight for each line within the simplex, said weight being defined by a significance of the data element.

3. The system of claim 1, wherein each simplex includes a weighted average of included data elements.

4. The system of claim 1, wherein the hardware processor is further operable to:
- receive an unlabeled data set; and
- associate the unlabeled data set with one of the plurality of neurons.

5. The system of claim 1, wherein the hardware processor is further operable to:
- receive an unlabeled data set; and
- label the unlabeled data set by the neural network.

6. The system of claim 1, wherein the hardware processor is further operable to:
- receive a first data set; and
- transform the first data set from a first language to a second language.

7. The system of claim 6, wherein the first language and the second language are human-spoken languages.

8. The system of claim 6, wherein the first language and the second language are computer languages.

9. A method for operating a pattern identification transformer neural network, the method comprising:
- receiving, at a multi-head attention module operating on a hardware processor and a hardware memory, a first data element comprising a first set of attributes; and
- converting, at the multi-head attention module operating on a hardware processor and a hardware memory, the first data element and the first set of attributes into a first vector;
- normalizing, at a normalization module operating on the hardware processor and the hardware memory, the first vector;
- adding, at a feed forward neural network operating on the hardware processor and the hardware memory, the first vector to the feed forward neural network;
- receiving, at the multi-head attention module, a second data element comprising a second set of attributes;
- converting, at the multi-head attention module, the second data element comprising the second set of attributes into a second vector; and
- examining, at the multi-head attention module, the feed forward neural network for a corresponding vector, included in the feed forward neural network, that corresponds to the second vector;
- examining, at the normalization module, the feed forward neural network for a plurality of vectors included in the feed forward network;
- adding, at the normalization module, the plurality of vectors to create a sum; and
- dividing, at the normalization module, the plurality of vectors by its sum to ensure that the plurality of vectors is a simplex;
- generating, at the normalization module, an answer; and
- using the answer, at the feed forward neural network, to enable a mapping between the second vector and a third vector.

10. The method of claim 9, wherein the plurality of vectors is used for a reconstruction.

11. The method of claim 9, wherein a map between a vector x and a vector y is approximated by $\hat{y}(x)=\Sigma_n y_{c,n} k_n(x,c_n)$, where n is the number of vectors, c is a previously stored vector and k is the plurality of vectors.

12. The method of claim 9, wherein all components of the simplex add up to 1.

13. The method of claim 9, wherein the second vector is a data element in a first language and the third vector is a data element in a second language.

14. The method of claim 13, wherein the first language and the second language are computer languages.

15. The method of claim 13, wherein the first language and the second language are human-spoken languages.

16. The method of claim 13, wherein the feed forward network tunes the plurality of vectors upon receiving a new vector.

* * * * *